United States Patent [19]

Acharya et al.

[11] 4,439,250

[45] Mar. 27, 1984

[54] SOLDER/BRAZE-STOP COMPOSITION

[75] Inventors: Shankar C. Acharya, Beacon; Thomas C. Prizzia, Wappingers Falls; Olha Rutigliano, Beacon, all of N.Y.

[73] Assignee: International Business Machines Corporation, Armonk, N.Y.

[21] Appl. No.: 502,802

[22] Filed: Jun. 9, 1983

[51] Int. Cl.$^3$ .............................................. B23K 35/34
[52] U.S. Cl. ...................................... 148/23; 148/25; 148/26
[58] Field of Search ................................... 148/23–26

[56] References Cited

U.S. PATENT DOCUMENTS

| | | | |
|---|---|---|---|
| 3,030,242 | 4/1962 | Gieselman | 148/23 |
| 3,073,270 | 1/1963 | Johnson | 148/23 |
| 3,162,551 | 12/1964 | Short | 148/23 |
| 3,301,688 | 1/1967 | Simpelaar | 148/23 |
| 3,309,239 | 3/1967 | Harris | 148/23 |
| 3,615,730 | 10/1971 | Law et al. | 106/1 |
| 3,703,386 | 11/1972 | Dietz | 106/39 R |
| 3,854,959 | 12/1974 | Costain et al. | 106/14 |
| 3,906,617 | 9/1975 | Behringer et al. | 228/118 |
| 3,927,817 | 12/1975 | Hamilton et al. | 228/157 |
| 4,181,755 | 1/1980 | Liu et al. | 430/314 |
| 4,307,132 | 12/1981 | Chu et al. | 427/90 |
| 4,360,392 | 11/1982 | Roberts | 148/23 |

OTHER PUBLICATIONS

IBM Technical Disclosure Bulletin, vol. 10, No. 1, Jun. 1967, "Solder Stop for Contact Pin," E. W. Clavez & E. G. Dingman, p. 7.

IBM Technical Disclosure Bulletin, vol. 14, No. 9, Feb. 1972, "Metallizing Composition for Ceramic Substrates", D. A. Chance & E. Urfer, p. 2603.

RCA Technical Notes, Jun. 1959, "Method of Preventing Solder Adherence", L. Pessel, RCA TN No. 259, pp. 1–2.

NASA Tech. Briefs, (Spring 1980), vol. 5, No. 1, "Alumina Barrier for Vacuum Brazing", L. B. Johnson Space Center, Houston, Texas, p. 106.

*Primary Examiner*—Peter D. Rosenberg
*Attorney, Agent, or Firm*—Mitchell S. Bigel

[57] ABSTRACT

An improved solder/braze-stop composition is impervious to splattered or flowed solder/braze material, is easily coated without streaking, is easily removed and leaves no contaminant residue. The improved solder/braze-stop composition comprises by weight:
  40–57% $Al_2O_3$ powder;
  27–43% Methyl Isobutyl Ketone; and
  12–22% of a vehicle comprising by weight:
    15–20% Ethyl Cellulose;
    75–80% 2- (2-Butoxyethoxy) Ethyl Acetate; and,
    5–10% Oleoyl Sarcosine.

9 Claims, No Drawings

SOLDER/BRAZE-STOP COMPOSITION

TECHNICAL DESCRIPTION

BACKGROUND OF THE INVENTION

1. Technical Field

This invention relates generally to soldering or brazing and more particularly to an improved solder/braze-stop composition for preventing adherence of unwanted solder/braze material on critical surfaces of a workpiece.

Solder/braze-stops are well known to those having skill in the soldering/brazing art, and are typically employed for preventing solder or braze material from splattering or flowing onto a critical surface of a workpiece. The solder/braze-stop, sometimes referred to as stopoff, is applied to those critical areas on a workpiece where splatter or flow must be prevented. Then, during soldering/brazing, the splattered or flowing material forms a ball on the stopoff and does not penetrate to the underlying workpiece. After brazing, the stopoff and any solder/braze material thereon is wiped off.

2. Background Art

The performance of commercially available stopoffs has not been completely satisfactory. For example, a commonly available stopoff is a suspension of alumina ($Al_2O_3$) particles in isopropyl alcohol (IPA). The performance of such an $Al_2O_3$+IPA stopoff is not completely satisfactory for the following reasons:

1. The stopoff dries rapidly upon application. Rapid drying causes streaking and reduces imperviousness to solder/braze. Moreover, it is difficult to double coat such a rapidly drying stopoff when required.
2. The stopoff does not adhere well to a workpiece.
3. Frequent agitation or stirring is required during use in order to keep the $Al_2O_3$ particles suspended in the IPA.
4. The stopoff is not totally impervious to solder/braze, so that some workpieces must be rejected.
5. After brazing, the stopoff forms a hard crust which is difficult to remove without damaging the underlying workpiece.
6. After removal, the stopoff leaves a residue which acts as a contaminant on the workpiece surface.

Accordingly, commercially available stopoffs have been satisfactory for those applications which require an impervious noncontaminating stopoff which is easily handled and easily wiped off.

DISCLOSURE OF THE INVENTION

It is therefore an object of the invention to provide an improved solder/braze-stop composition.

It is a further object of the invention to provide an improved solder/braze-stop composition which dries readily but slowly enough to allow a second coat prior to drying.

It is another object of the invention to provide a solder/braze-stop composition which is totally impervious to solder or braze.

It is another object of the invention to provide a solder/braze-stop composition which is easily handled, easily removed, and does not leave contaminant residues on the workpiece.

These and other objects are provided by a solder/braze-stop composition which comprises, by weight, 40-57% $Al_2O_3$ powder mixed with 27-43% Methyl Isobutyl Ketone and 12-22% of a vehicle comprising by weight 15-20% Ethyl Cellulose, 75-80% 2-(2-Butoxyethoxy)Ethyl Acetate, and 5-10% Oleoyl Sarcosine. This solder/braze-stop composition overcomes the above described commercial stopoff performance limitations as follows:

1. The solder/braze-stop composition of the present invention dries readily (within about 20 seconds), yet slowly enough to avoid streaking and to allow a second coat if necessary. While it has been found that one coat of the improved solder/braze stop composition is generally sufficient, it is sometimes necessary to provide a second coat, e.g., when the first coat has been improperly applied.
2. The solder/braze stop composition of the present invention adheres well to an underlying workpiece.
3. Frequent stirring, agitation or any other unusual handling is not required.
4. A single coat of the solder/braze stop composition of the present invention provides an impervious coating.
5. After brazing, the solder/braze stop composition of the present invention forms a cake-like surface which is easily stripped from the workpiece with a damp cloth, air brush or other means.
6. The solder/braze stop of the present invention does not leave contaminant residue on the workpiece.

BEST MODE FOR CARRYING OUT THE INVENTION

The improved solder/braze-stop composition of the present invention includes alumina ($Al_2O_3$) powder, Methyl Isobutyl Ketone decoagulant, and a vehicle. The composition and the method of formulating and using the composition will be described more particularly below.

The improved braze-stop composition comprises, by weight, about 40-57% $Al_2O_3$ powder, preferably of 95-99% purity, having average particle size less than 5 microns and a preferred average particle size of about 4 microns. In a preferred embodiment about 48% alumina powder is employed. Suitable alumina powder may be ball milled according to known techniques, to obtain the requisite average particle size.

The solder/braze-stop also includes about 27-43% by weight, Methyl Isobutyl Ketone (MIBK), having greater than 99% purity, with about 36% MIBK being preferred. MIBK acts as a decoagulant for keeping the alumina powder in suspension.

The composition also includes 12-22% by weight, of a vehicle, with 17% being preferred. The vehicle comprises about 15-20% by weight of Ethyl Cellulose, preferably having greater than 99.5% purity, 75-80% by weight of 2-(2-Butoxyethoxy)Ethyl Acetate, preferably having greater than 96.5% purity, and 5-10% by weight of Oleoyl Sarcosine, preferably having greater than 94% purity. The preferred vehicle composition contains 20% Ethyl Cellulose, 75% Ethyl Acetate and 5% Oleoyl Sarcosine.

The solder/braze-stop composition of the present invention may be applied to the critical surface of a workpiece with a sponge or a brush. The workpiece is then brazed (e.g., at approximately 400° C.), or a soldered (e.g., at approximately 200° C.) in a manner well known to those having skill in the art. Generally a single braze-stop coat is sufficient to provide an impervious coating. After soldering/brazing, the braze stop forms a cake-like coating and is easily wiped off with a wet cloth or air brush. The balled-up solder/braze wipes off with the coating.

EXAMPLE

The vehicle of the present invention was formed by mechanically mixing 20% by weight Ethyl Cellulose (N-7) obtained from Hercules Corp., 75% by weight Ethyl Acetate obtained from Eastman Kodak, and 5% Oleoyl Sarcosine, obtained from Ciba-Geigy Corp. under the trademark SARKOSYL-O. Alcan RG-75 alumina powder was ball-milled to approximately 4 micron particle size. About 17% vehicle and 40% alumina powder were mechanically mixed. Then about 36% Methyl Isobutyl Ketone, supplied by Burdick and Jackson Laboratory, Inc., was added to form the solder/braze stop of the present invention.

A braze preform, comprising gold/tin alloy was placed on a workpiece, and the solder/braze stop was brushed onto the critical surfaces of the workpiece. The workpiece was then placed in a furnace for a one hour braze cycle at maximum temperature of about 400° C., with the temperature being between 350° C. and 400° C. for 4-7 minutes.

After brazing, balled-up braze was found on the braze-stop. The braze-stop and the balled-up braze were easily wiped off with a wet cloth. Subsequent analysis showed that no braze material or other contaminants remained on the critical surface. This sharply contrasts with commercially available braze stops which were difficult to remove, permitted braze material to penetrate to the critical surface and left a residue on the critical surface.

Whereas we have illustrated and described the preferred embodiment of the invention, it is to be understood that we do not limit ourselves to the precise construction herein disclosed and the right is reserved to all changes and modifications coming within the scope of the invention as defined by the appended claims.

We claim:
1. A solder/braze-stop composition, comprising by weight:
   40-57% $Al_2O_3$ powder;
   27-43% Methyl Isobutyl Ketone; and
   12-22% of a vehicle comprising by weight:
      15-20% Ethyl Cellulose;
      75-80% 2-(2-Butoxyethoxy)Ethyl Acetate; and,
      5-10% Oleoyl Sarcosine.
2. A solder/braze-stop composition, comprising by weight:
   48% $Al_2O_3$ powder;
   36% Methyl Isobutyl Ketone; and
   17% of a vehicle comprising by weight:
      20% Ethyl Cellulose;
      75% 2-(2-Butoxyethoxy)Ethyl Acetate; and,
      5% Oleoyl Sarcosine.
3. The solder/braze-stop composition of claims 1 or 2 wherein said $Al_2O_3$ powder has average particle size of less than 5 microns.
4. The solder/braze-stop composition of claims 1 or 2 wherein said $Al_2O_3$ powder has average particle size of 4 micron.
5. The solder/braze-stop composition of claims 1 or 2 wherein said $Al_2O_3$ powder has greater than 95% purity.
6. The solder/braze-stop composition of claims 1 or 2 wherein said Methyl Isobutyl Ketone has greater than 99% purity.
7. The solder/braze-stop composition of claims 1 or 2 wherein said Ethyl Cellulose has greater than 99.5% purity.
8. The solder/braze-stop composition of claims 1 or 2 wherein said 2-(2-Butoxyethoxy)Ethyl Acetate has greater than 96.5% purity.
9. The solder/braze-stop composition of claims 1 or 2 wherein said Oleoyl Sarcosine has greater than 94% purity.

* * * * *